CONTROL CIRCUIT CONNECTING CORDS

Original Filed March 3, 1965

SHUNSEI KRATOMI
INVENTOR.
BY Flynn & Frishauf
Attys

Dec. 1, 1970 SHUNSEI KRATOMI 3,544,807
CONTROL CIRCUIT CONNECTING CORDS
Original Filed March 3, 1965 4 Sheets-Sheet 3
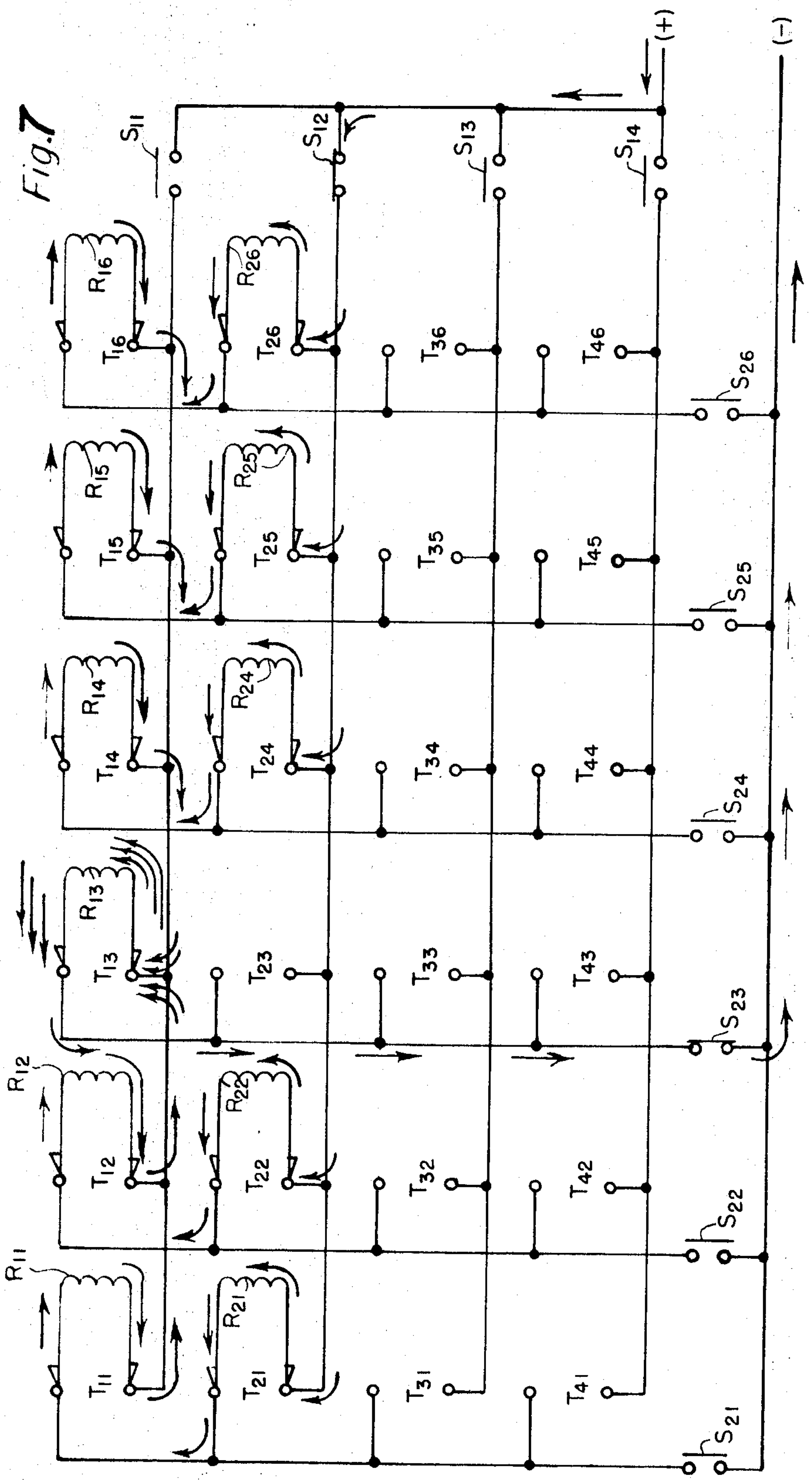
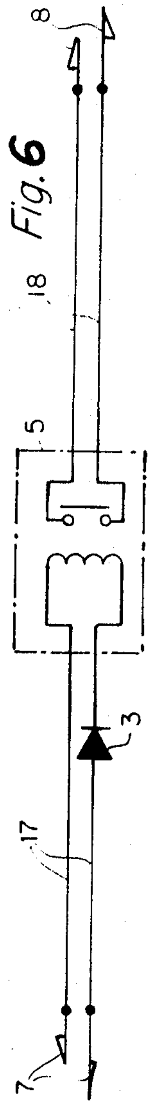

Dec. 1, 1970 SHUNSEI KRATOMI 3,544,807

CONTROL CIRCUIT CONNECTING CORDS

Original Filed March 3, 1965 4 Sheets-Sheet 4

United States Patent Office 3,544,807

Patented Dec. 1, 1970

3,544,807

CONTROL CIRCUIT CONNECTING CORDS

Shunsei Kratomi, Tokyo, Japan (456 Maegawa, Tachibana-machi Ashigara-shimo-gun, Kanagawa-ken, Japan)

Application Aug. 30, 1966, Ser. No. 588,642, now Patent No. 3,475,747, dated Oct. 28, 1969, which is a continution of application Ser. No. 436,743, Mar. 3, 1965. Divided and this application June 2, 1969, Ser. No. 842,419

Claims priority, application Japan, Mar. 7, 1964, 39/12,506, 39/12,508, 39/12,509; Jan. 13, 1965, 40/1,359, 40/1,360, 40/1,362

Int. Cl. H01r *35/00*

U.S. Cl. 307—112 6 Claims

ABSTRACT OF THE DISCLOSURE

Connecting cord for control circuits and the like having primary and secondary leads and an isolation device, such as a transformer or relay, for transmitting electrical signals between the primary and secondary leads.

This is a division of application Ser. No. 588,642, filed Aug. 30, 1966, now U.S. Pat. No. 3,475,747, which was a continuation of application Ser. No. 436,743, filed Mar. 3, 1965, now abandoned.

The present invention relates to connecting cords for use in control circuitry, and more particularly to connecting cords for use in an AND-circuit controlled program switch for controlling utilization devices.

A program switch with which the connecting cords of the present invention are used can control a number of utilization circuits. The program provided by the program switch can be easily set, selective control of the program being obtained by means of connection cords which use two-pole plugs in combination with two-pole jacks. The interconnection between the program switch and the utilization circuits is also accomplished by means of connecting cords.

It is the primary object of the present invention to provide connecting cords for use in control circuitry such as that described above, which are inexpensive, simple in design, constructed from readily available components and which provide highly reliable service.

SUMMARY OF THE INVENTION

Briefly, in accordance with the present invention, a connecting cord for interconnecting a source of control signals and a utilization circuit comprises primary lead wires connected to a primary two-pole connecting device and secondary lead wires connected to a secondary two-pole connecting device. Further provided is coupling means interconnecting the primary and secondary lead wires and isolating them electrically while transmitting electrical signals from the primary lead wires to the secondary lead wires.

BRIEF DESCRIPTION OF THE DRAWINGS

FIG. 6 shows a further embodiment of a connecting cord according to the present invention;

FIG. 7 is a simplified schematic illustration of a portion of a control circuit with which the cords of FIG. 6 are useful.

DESCRIPTION OF THE PREFERRED EMBODIMENTS

The connecting cords of the present invention can be used in many different control applications. However, the connecting cords are herein described with reference to the AND-circuit controlled program switch set forth in co-pending patent application Ser. No. 588,642, filed Aug. 30, 1966. The following detailed description is given merely by way of example, and it is not intended to limit the use of the connecting cords of the present invention with the aforementioned AND-circuit controlled program switch.

Figure 1:
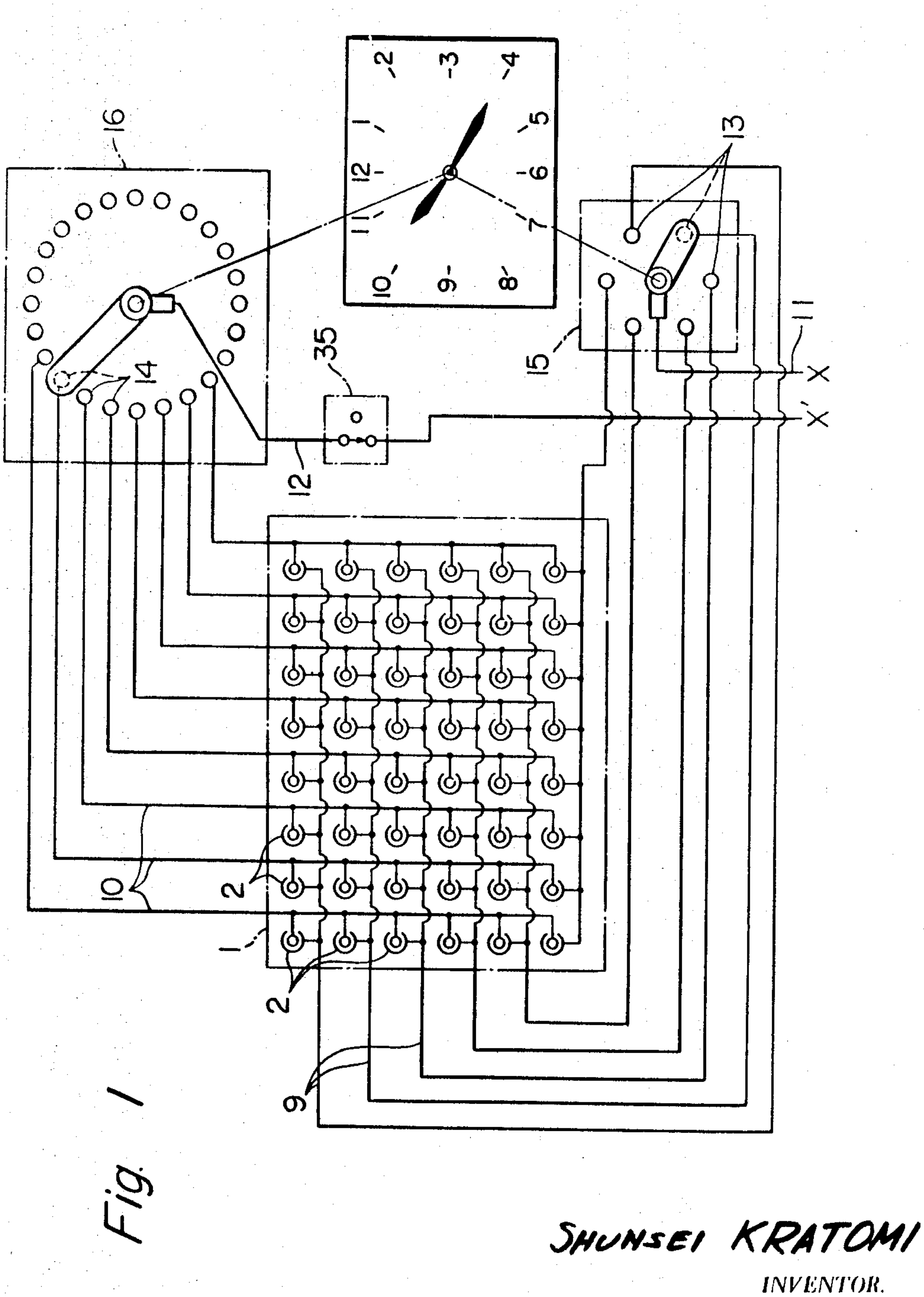
FIG. 1 is a schematic diagram of an AND-circuit controlled program switch with which the connecting cords of the present invention may be used.
Figures 2, 3, 4, 5A, 5B:
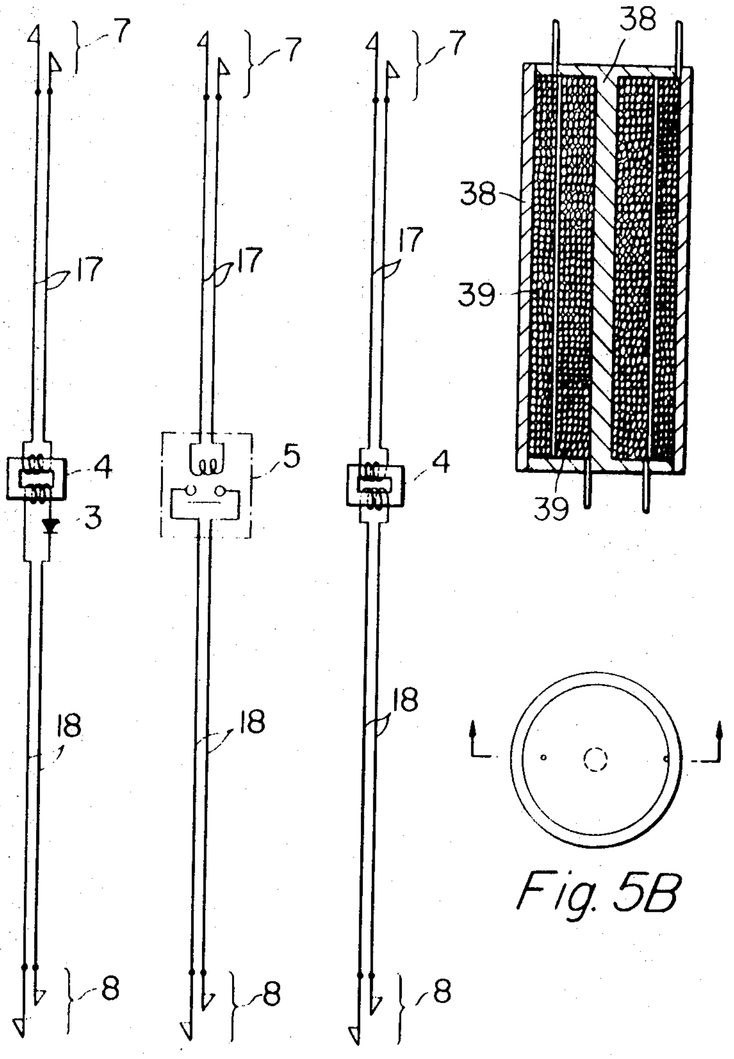
FIG. 2 shows a connecting cord of the present invention utilizing an inductive coupling device and a diode.
FIG. 3 shows an alternate embodiment of the connecting cord of the present invention utilizing a relay.
FIG. 4 shows yet another embodiment of the present invention utilizing only inductive coupling.
FIG. 5A is a cross-sectional view of the induction coupler used in connecting cords of this invention.
FIG. 5B is a top view of the induction coupler.

Referring now to the drawings, and in particular to FIG. 1; a matrix circuit 1 has a series of row buses 9 and column buses 10 and at their intersection, two-pole connectors 2 are provided for use with the special connecting cords shown in FIGS. 2–4. The connecting cords may contain a diode 3 (FIG. 2) with or without an induction coupler 4 (FIG. 4) or a reed relay 5 (FIG. 3). The two-pole connectors of the matrix circuit are arranged on a programming board 6 in an orderly fashion, such as shown in FIG. 6 of the above-identified co-pending application. Special connecting cords (to be described hereinafter) having a first, or primary two-pole plug 7 at the primary end, and a secondary two-pole plug 8 at the other end are used for electrically connecting utilization circuits to the matrix circuit.

The row buses 9 are connected to a main bus 11 through a row-bus switch 15. The column buses 10 are connected to a main bus 12 through a column bus switch 16. Main buses 11, 12 are connected to terminals X–X'. With respect to the jacks 2, switches 15, 16 constitute an AND-circuit.

The row-bus switch 15 has contacts 13; column-bus switch 16 has contacts 14. The contacts are arranged to be driven by a clock, with each elemental switch contact being closed successively at constant intervals of time, and opening shortly before the next contact is closed to repeat switching action with a constant cyclical period. The switches 15, 16 are synchronized together, as indicated by the dash-dot lines interconnecting the clock with the switch units. The clock switch preferably utilizes a combination of a stepping rotary switch and a pulse motor, controlled by clock pulses, as shown schematically in FIG. 1; however, no restriction is placed on the invention with respect to the type of switch involved.

Row-bus clock switch 15 and column-bus clock switch 16 are synchronized in such a manner that the period of a complete cycle for the row-bus clock switch 15 coincides with the time interval that a contact 14 is connected to column line 10 by the column-bus switch 16. In FIG. 1, matrix circuit 1 has 6 row-buses 9 and thus also six contacts 14; there are eight column-buses 10, and connections to eight contacts 14. If the dwell time of the contacts 13 is ten minutes, and the cycling of the row-bus clock 15 is one hour, the column-bus clock 16 should have dwell times of one hour on each one of the contacts 14, that is, should step in one hour intervals, completing a cycle in eight hours. Of course, any number of column buses and row buses can be used to provide for any number of time periods and time cycles.

A two-pole jack 2 is, at the same time, connected to the main buses 11, 12 only once in any cycle of performance of both of the clocks 15, 16, that is when both the associated row-bus switch contact 13 and column-bus switch contact 14 is closed at the same time, thus forming the AND-function. Each jack 2 of the matrix circuit, as arranged on a programming board, for example, thus has a specific time when it is connected to terminals X–X′ through the main buses 11, 12. Terminals X–X′ may be further connected to a power source.

The total circuit functions as an AND-circuit controlled program switch when cooperating with the special connecting cords shown in FIGS. 2–4 respectively.

The programming procedure for a system of the present invention is by connecting a two-pole jack of the matrix circuit, which corresponds to a desired time for excitation, to the utilization circuit by means of the special connecting cord.

The connecting cord illustrated in FIG. 2 consists of a first, or primary two-pole plug 7, primary lead wires 17, secondary lead wires 18, a secondary two-pole plug 8, and a component 4 to isolate the primary wires 17 and the secondary wires 18 from each other electrically, while still providing for signal transfer therebetween. In FIG. 2, this isolating device 4 is an induction coupler 4 which transmits electrical signals from the primary lead to the secondary lead wire. A diode 3 is further inserted into the secondary wires. The operating principle and the basic structure of the induction coupler are the same as those of an ordinary transformer, its major function is to provide a closed loop to signal current at the primary side and to isolate the secondary lead wires 18 from the primary wires 17. The induction coupler 4 may, of course, also act as a transformer by suitable choice of turns ratio of its windings. The induction coupler 4 for the connecting cords should be as small and compact as possible for easy handling. FIG. 5A shows such a coupler in cross-section. It has a central, and circumferentially closed magnetic path 38, using a cylindrical shell, and end discs to close the magnetic circuit. The shell and disc also protect windings 39 from mechanical damage as well as stray magnetic interference. The primary and the secondary windings of the induction coupler 4 shown in FIG. 2 may be wound on the coupler of FIG. 5 either concentrically around a central core, or side by side, as desired.

Diode 3 inserted in the secondary lead wire 18, in combination with an induction coupler 4, is a desirable component to prevent feedback interference between utilization circuits which are connected to the same jack of the matrix circuit, and which are further connected by other connecting cords to other jacks of the matrix. This condition exists, for example, when repeated excitation of the same utilization circuit at repeated times is desired.

In order to avoid misconnection of the cords, the primary plug 7 of the cords should preferably be of a different size or shape than the secondary plug 8; further, the sheaths of the primary cords 17 are preferably of a color which is different from the sheaths 18 of the secondary.

The connecting cord of FIG. 3 utilizes a miniature relay, such as a reed relay 5 to provide isolation between primary and secondary leads. Relay 5 replaces both diode 3 and induction coupler 4 of the cord of FIG. 2. Relay 5 may have normally open, or normally closed contacts, depending on the function of the circuit to be controlled. Both cords of FIGS. 2 and 3 can isolate the utilization or load circuit from the primary plugs 7 and the jacks to be associated therewith, and may thus be used in practically any application.

A simpler cord as shown in FIG. 4, and also providing for isolation between primary and secondary leads, contains only an induction coupler 4, and may be used for limited purposes. It is identical to the cord of FIG. 2 except that the diode 3 is lacking. In programming utilization of the circuit using the cord of FIG. 4, a different circuit may be excited repeatedly, or different circuits may be excited at individually non-overlapping times; it is not possible, however, to excite a number of utilization circuits repeatedly and in such a manner that there is overlap between two or more time periods of excitation. For such programming, the cords of FIG. 2 or FIG. 3 must be used to prevent undesirable spurious (or "sneak") circuit paths.

To provide for excitation of multiple utilization circuits, at the same time, the jacks 2 at the intersection of row and column buses 9, 10 can be arranged to accept more than a single cord, or a plurality of such jacks can be provided in parallel. Alternatively, the plugs 7 of the connecting cords can be arranged to accept an additional plug, in parallel, while at the same time forming connecting points for primary lead wires 17. Such a modified plug configuration is known in the electrical art.

It has been found that under certain conditions there is a possibility of malfunction of the control circuit when a large number of the connecting cords of FIG. 3 (which utilize relays) are used with the control circuit of FIG. 1. FIG. 6 illustrates a modified form of connecting cord which eliminates the possibility of malfunction under these conditions and FIG. 7 is a simplified schematic illustration of a portion of a control circuit in which the malfunction could occur. FIG. 7 shows only the primary leads and winding of the connecting cords for the sake of clarity.

Referring to FIG. 7, the jacks at the cross-points of the control circuit matrix are designated $T_{mn}$ wherein $m$ designates the row and $n$ designates the column in which the respective jack is located. The primary windings of the relays of the connecting cords are designated as $R_{mn}$ wherein $m$ designates the row and $n$ designates the column in which the respective connecting cord is connected. The switches are designated $S_{1x}$ and $S_{2y}$ wherein $x$ designates the row and $y$ designates the column in which the respective switch is connected. The simple switches S are shown in FIG. 7 merely by way of example. The arrows in FIG. 7 indicate the directions of current flow. The connecting cords illustrated in FIG. 7 are those of FIG. 3 which clearly point out the possible malfunctions that can occur.

Theoretically, when switches $S_{12}$ and $S_{23}$ are energized, no utilization circuit should be excited through a connecting cord since no connecting cord is connected to the jack $T_{23}$ of the matrix control circuit shown in FIG. 7. However, when switches $S_{12}$ and $S_{23}$ are energized, current will flow throughout the system in the directions indicated by the arrows. The current flowing through all of the relays will add together and pass through the relay winding $R_{13}$ of the connecting cord plugged into jack $T_{13}$. If the number of relay-type connecting cords used in the system is large, more current will add up and pass through relay $R_{13}$. If the resulting current is large enough, relay $R_{13}$ will be energized and will excite its corresponding utilization circuit. This is clearly a malfunction since switch $S_{11}$ which, in conjunction with switch $S_{23}$, would normally operate relay $R_{13}$ has not been operated. As can be seen from FIG. 7, the more relay-type connecting cords used, the greater will be the possibility of a malfunction occurring.

The malfunction described above can be eliminated by utilizing a diode inserted in the primary lead wires of the relay-type connecting cords with the polarity as shown in FIG. 6. By inserting the diode 3 of FIG. 6 into the primary leads of the relay-type connecting cords such as those of FIG. 7, the spurious currents will be blocked through relays $R_{11}$, $R_{12}$, $R_{14}$, $R_{15}$, and $R_{16}$. This will effectively block all of the spurious current which would otherwise flow through relay $R_{13}$ in FIG. 7.

Figures 8, 9:
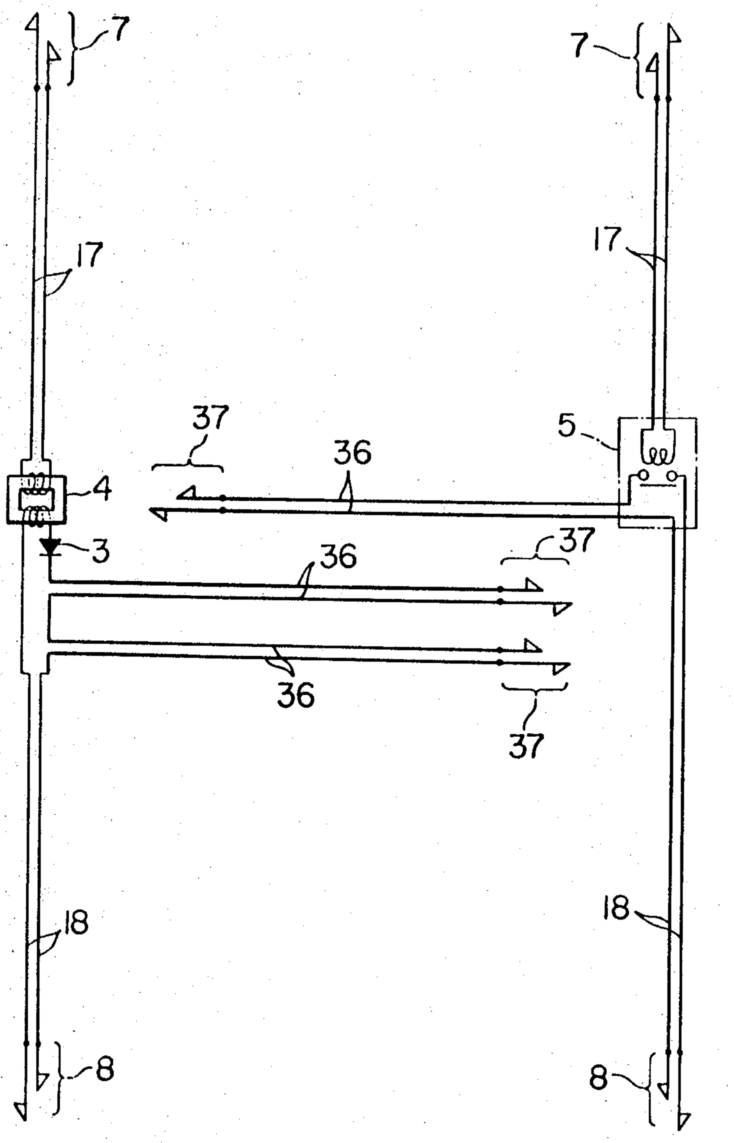
FIGS. 8 and 9 show connecting cords having tertiary lead wires.

FIGS. 8 and 9 illustrate special connecting cords useful in certain embodiments of the present invention. The connecting cord of FIG. 8 has one, or two tertiary leads 36, added in series with the secondary lead wire 18 of the cord of FIG. 2. In the cord of FIG. 9, a tertiary lead wire 36 is added in series with the secondary lead wire of the cord of FIG. 3. The tertiary lead wire has a two-pole plug 37 at its end and is adapted to be connected to a second clock switch circuit synchronized with the other clock switches of FIG. 1, so that the total combination of the AND-circuit of the primary side and the second clock switch circuit including a secondary AND-circuit and connected to the tertiary plugs 37 form an integrated-AND-circuit of a higher order, that is requiring a higher order of coincidence of events. The second clock switch circuit with which the tertiary cords of FIGS. 8 and 9 are used differs from that of FIG. 1 in that the main bus 11 for the rows, and the main bus 12 for the columns are connected together; the electrical equivalent to FIG. 1 is short-circuiting the terminals at X–X′. In operation, for example, the column-bus switch contacts 14 of the second clock switch circuit step forward at one-minute intervals, and row-bus switch contacts 13 of the second clock switch circuit step forward at ten-minute intervals, the tertiary leads being connected to the second clock switch circuit. The primary leads of hte cord of FIG. 1 or 10 are connected to the circuit of FIG. 1 wherein the row-bus switch contacts 13 step forward at one-hour intervals and the eight-column-bus switches 14 step forward at six-hour intervals, for example. The total circuit will function as an integrated AND-circuit controlled program switch for a utilization circuit, with a cyclical period of forty-eight hours, yet permitting programming at a minimum interval of one minute. For implementing the above example, the connecting cord of FIG. 8 or 9 needs to have only one tertiary lead wire; alternatively one of its tertiary lead wires may be short-circuited, or connected to a short-circuited two-pole jack.

By virtue of the connecting cords of the present invention, the programming procedure for the control apparatus of FIG. 1 is simple, and can readily be changed; no interference between connecting cords will arise when the program is modified during operation. Repetitive or cyclic use is easily achieved; if a subsequent program is quite similar to a previous one, however, a minimum amount of effort is required to modify the programming, due to the non-destructive patch cord memory mechanism.

I claim:

1. A connecting cord for interconnecting a source of control signals and a utilization circuit, said cord comprising a primary two-pole connecting means, primary lead wires, secondary lead wires, a secondary two-pole connecting means, coupling means interconnecting said primary and said secondary lead wires and isolating them electrically while transmitting electrical signals from the primary lead wires to the secondary lead wires, and at least one pair of tertiary lead wires, each pair of tertiary lead wires having a two-pole connecting means at one end, the other end of said tertiary lead wires being connected in series with said secondary lead wires.

2. Cord as claimed in claim 1, further including a diode inserted in one of the secondary lead wires.

3. A connecting cord for interconnecting a source of control signals and a utilization circuit, said cord comprising a primary two-pole connecting means, primary lead wires, secondary lead wires, a secondary two-pole connecting means, and coupling means including a relay interconnecting said primary and said secondary lead wires, said primary lead wires being connected to the coil of said relay and said secondary lead wires being connected to the contacts of said relay, thereby electrically isolating said primary and secondary lead wires while transmitting electrical signals therebetween.

4. Cord as claimed in claim 3, further including a diode inserted in one of the primary lead wires.

5. Cord as claimed in claim 3 wherein said relay is a reed relay.

6. Cord as claimed in claim 3, further including at least one pair of tertiary lead wires, each pair having a two-pole connecting means at one end, the other end of tertiary lead wires being connected in series with said secondary lead wires.

References Cited

UNITED STATES PATENTS

| | | | |
|---|---|---|---|
| 2,251,898 | 8/1941 | Sittler et al. | 336—107X |
| 2,436,742 | 2/1948 | Bussey | 336—107 |
| 3,237,079 | 2/1966 | Mas | 336—107X |
| 3,327,253 | 6/1967 | Campbell | 336—107X |

ROBERT K. SCHAEFER, Primary Examiner
T. B. JOIKE, Assistant Examiner

U.S. Cl. X.R.

307—147; 336—105; 317—123